United States Patent
Ninomiya et al.

(10) Patent No.: US 10,591,043 B2
(45) Date of Patent: Mar. 17, 2020

(54) VARIABLE TRANSMISSION SYSTEM FOR VEHICLE

(71) Applicant: TOYOTA JIDOSHA KABUSHIKI KAISHA, Toyota-shi (JP)

(72) Inventors: Keisuke Ninomiya, Susono (JP); Akira Ijichi, Odawara (JP); Naoyuki Shibata, Susono (JP); Tatsuya Saito, Gotenba (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 291 days.

(21) Appl. No.: 15/700,469

(22) Filed: Sep. 11, 2017

(65) Prior Publication Data
US 2018/0073623 A1    Mar. 15, 2018

(30) Foreign Application Priority Data
Sep. 13, 2016 (JP) .................. 2016-178397

(51) Int. Cl.
*F16H 55/52* (2006.01)
*F16H 7/06* (2006.01)
*F16H 7/08* (2006.01)

(52) U.S. Cl.
CPC ............ *F16H 55/52* (2013.01); *F16H 7/06* (2013.01); *F16H 2007/0802* (2013.01); *F16H 2007/0868* (2013.01)

(58) Field of Classification Search
CPC ........... Y10T 477/624; Y10T 477/6242; Y10T 477/62427; F16H 61/12; F16H 61/66272; F16H 2061/1224; F16H 9/24; F16H 55/52; F16H 7/06; F16H 2007/0868; F16H 2007/0802

USPC .......................................... 474/8, 17, 18, 28
See application file for complete search history.

(56) References Cited

U.S. PATENT DOCUMENTS

| | | | | |
|---|---|---|---|---|
| 6,129,643 A | * | 10/2000 | Tamagawa | .............. F16H 55/56 474/10 |
| 6,547,693 B1 | | 4/2003 | Bolz et al. | |
| 2013/0165295 A1 | * | 6/2013 | Kabe | ................... F16H 61/6648 477/37 |
| 2013/0260960 A1 | * | 10/2013 | Aoyama | ................... F16H 9/16 477/45 |

(Continued)

FOREIGN PATENT DOCUMENTS

| | | |
|---|---|---|
| JP | 2001-330084 | 11/2001 |
| JP | 2003-504576 A | 2/2003 |

(Continued)

*Primary Examiner* — Michael R Mansen
*Assistant Examiner* — Juan J Campos, Jr.
(74) *Attorney, Agent, or Firm* — Oblon, McClelland, Maier & Neustadt, L.L.P.

(57) ABSTRACT

A variable transmission system for a vehicle is configured such that, when a magnitude of a hydraulic pressure detected by an hydraulic pressure sensor is a first predetermined value or more, a chord portion of a chain belt is pressed such that a raceway length of the chain belt is extended by at least a circumferential extension amount of the chain belt at the time when the magnitude of the hydraulic pressure is the first predetermined value. Hereby, it is possible to restrain the chain belt from coming off from a sheave even in a low vehicle speed range, at a low cost, without causing a fuel efficiency decrease and a driving torque decrease of the vehicle.

5 Claims, 12 Drawing Sheets

(56) References Cited

U.S. PATENT DOCUMENTS

2014/0221154 A1* 8/2014 Tatewaki ............... F16H 61/12
477/45

FOREIGN PATENT DOCUMENTS

| JP | 2004-76906 | 3/2004 |
| JP | 2008-248935 | 10/2008 |

* cited by examiner

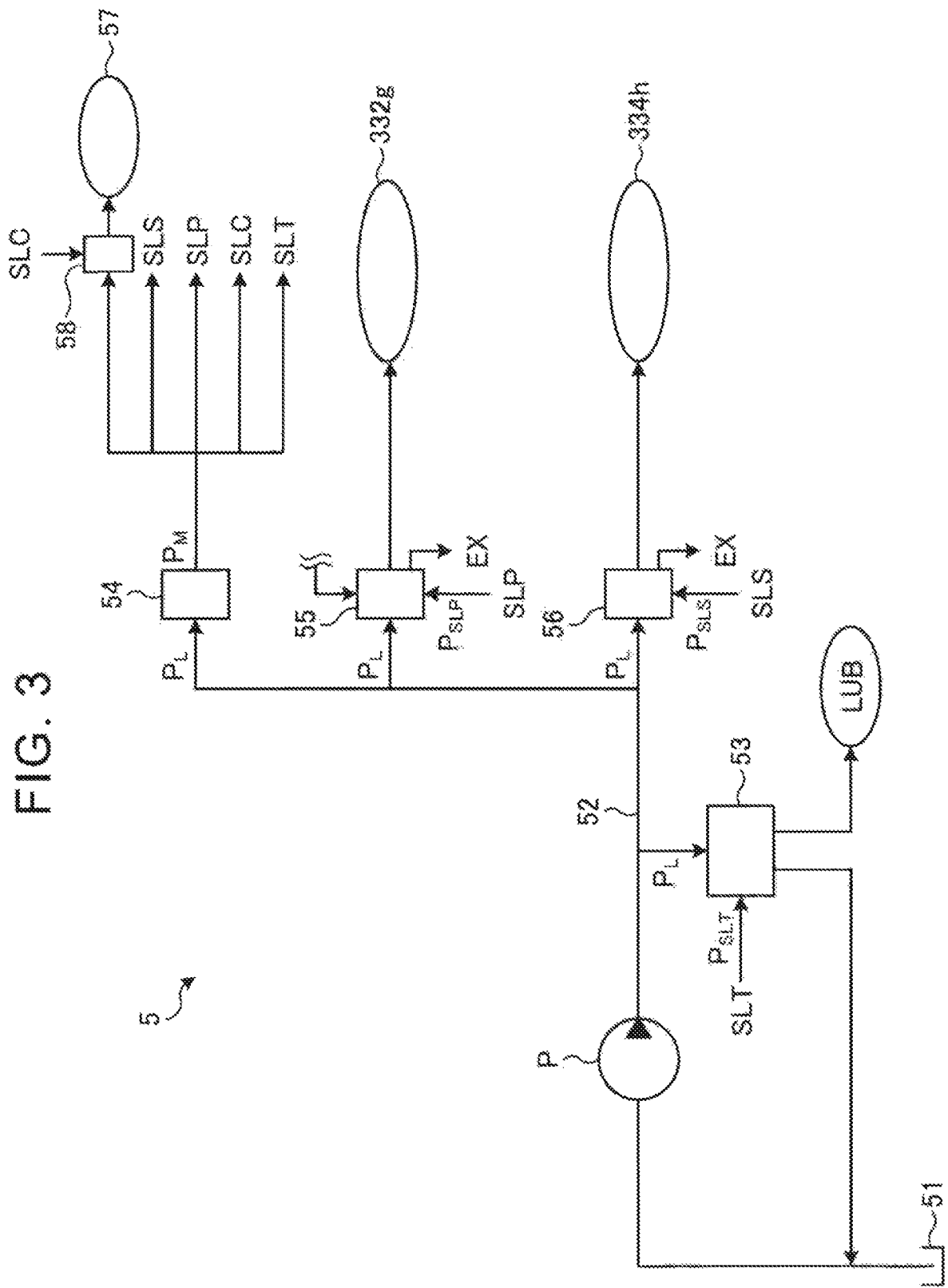

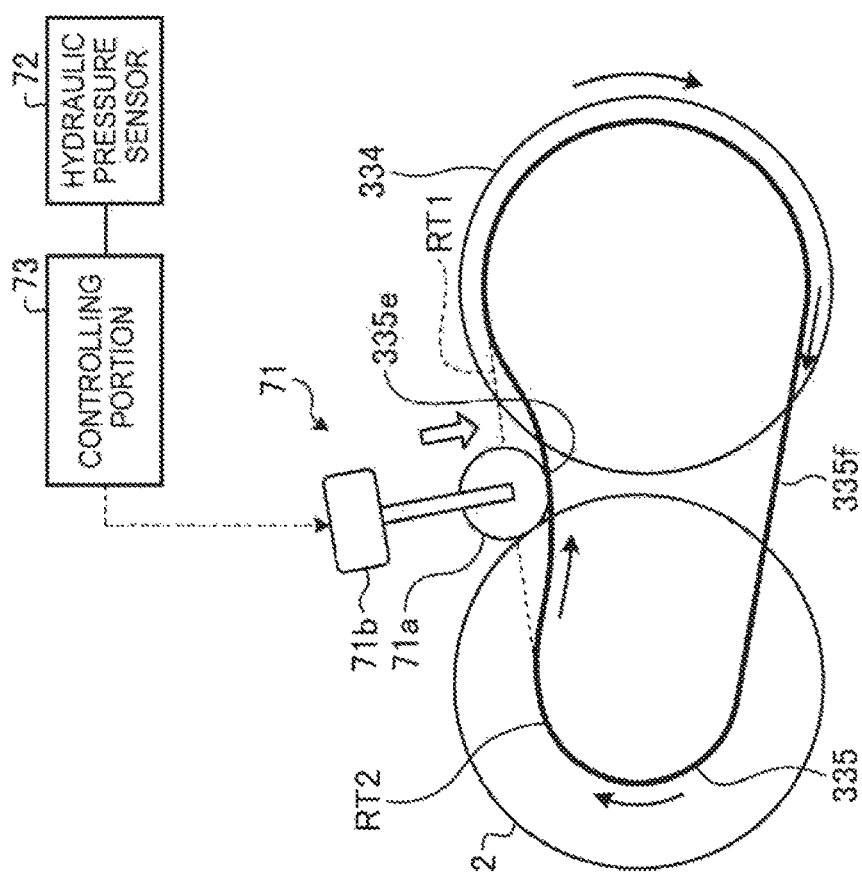
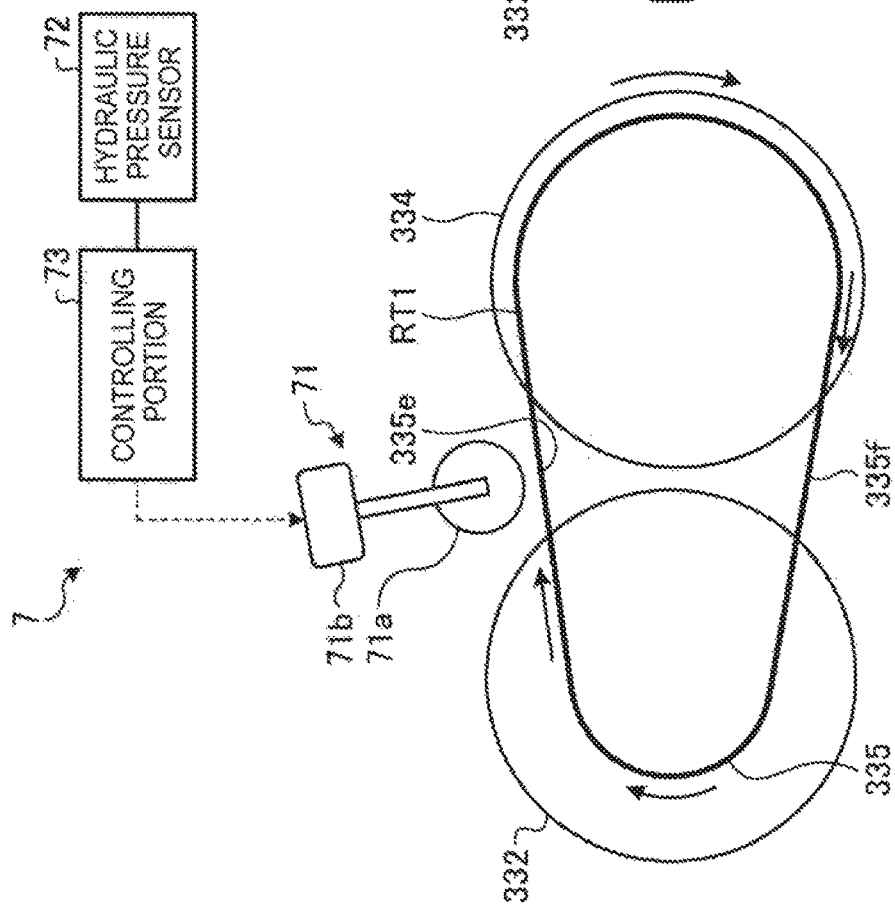
FIG. 4A
FIG. 4B

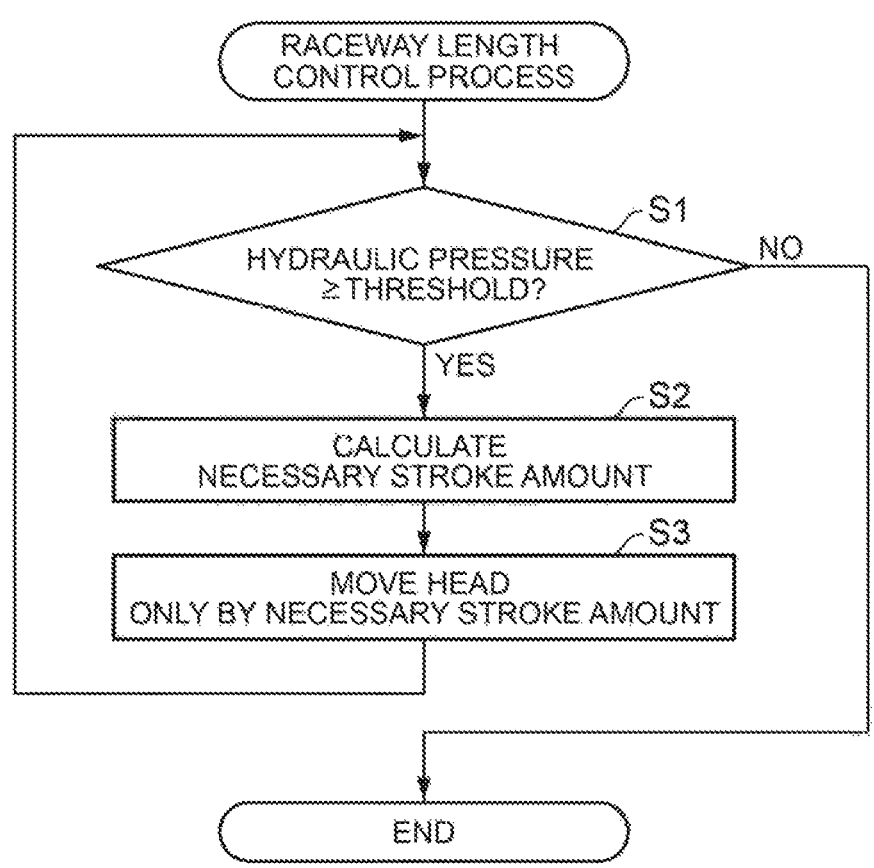

VARIABLE TRANSMISSION SYSTEM FOR VEHICLE

INCORPORATION BY REFERENCE

The disclosure of Japanese Patent Application No. 2016-178397 filed on Sep. 13, 2016 including the specification, drawings and abstract is incorporated herein by reference in its entirety.

BACKGROUND

1. Technical Field

The present disclosure relates to a variable transmission system for a vehicle.

2. Description of Related Art

Generally, as a transmission for a vehicle, there has been known a chain-belt continuously variable transmission configured such that a chain belt is wound on a primary pulley and a secondary pulley and winding radiuses of the chain belt to the pulleys are changed continuously, so that a transmission ratio can be changed continuously. In such a transmission, at the time of a high load, the chain belt is extended in a circumferential direction, so that the winding radius of the chain belt becomes larger than an outside diameter of a sheave constituting the pulley. This might result in that the chain belt runs onto an outer peripheral surface of the sheave or the chain belt comes off from the sheave. From such a background, Japanese Patent Application Publication No. 2004-76906 (JP 2004-76906 A) proposes a control device that restrains a chain belt from extending in a circumference direction. More specifically, the control device described in JP 2004-76906 A detects the extension of the chain belt in the circumference direction based on a transmission ratio calculated by rotation numbers of pulleys or input and output torques of a transmission. In a case where the extension of the chain belt in the circumference direction is detected, a fail control such as a transmission ratio control and a torque down control is executed.

SUMMARY

However, generally, the rotation number of the pulley cannot be detected accurately in a low vehicle speed range. On this account, the control device described in JP 2004-76906 A cannot detect the extension of the chain belt in the circumference direction accurately in the low vehicle speed range, because the calculation accuracy of the transmission ratio decreases. This might result in that the chain belt runs onto the outer peripheral surface of the sheave or the chain belt comes off from the sheave. In the meantime, in a case where the extension of the chain belt in the circumference direction is detected based on the input and output torques of the transmission, a torque sensor for detecting the input and output torques is required, which increases a cost of the transmission. Note that, in order to solve the above two problems, it is conceivable that the winding radius of the chain belt to the secondary pulley at the time of a low load is set small in advance in consideration of an extension amount of the chain belt in the circumference direction at the time of a high load.

More specifically, the following assumes a case where, like a winding radius r11 illustrated in FIG. 13, a winding radius of a chain belt 103 at the time of a low load is set to a size equivalent to an outside diameter r12 of a sheave 102 constituting a secondary pulley. In this case, when the chain belt 103 extends in a circumference direction due to a tensile force at the time of a low load, the winding radius of the chain belt 103 becomes larger than the outside diameter r12 of the sheave 102, like a raceway RT11 of the chain belt 103 as illustrated in FIG. 13. Hereby, the chain belt 103 easily comes off from the sheave 102. In view of this, in consideration of the extension of the chain belt 103 in the circumference direction at the time of a high load, it is conceivable that the winding radius r13 of the chain belt 103 at the time of a low load is set sufficiently smaller than the outside diameter r12 of the sheave 102, like a raceway RT12 of the chain belt 103 as illustrated in FIG. 13. However, when the winding radius of the chain belt 103 to the secondary pulley at the time of a low load is set small, a transmission ratio at the time of a low load becomes small, so that a range where the transmission ratio can be changed is reduced. This accordingly causes a fuel efficiency decrease or a driving torque decrease of a vehicle. Note that, in FIG. 13, a reference sign 101 indicates a sheave constituting a primary pulley.

The present disclosure restrains a chain belt from coming off from a sheave even in a low vehicle speed range at a low cost, without causing a fuel efficiency decrease and a driving torque decrease of a vehicle.

An aspect of the present disclosure is a variable transmission system for a vehicle. The variable transmission system includes a primary pulley, a secondary pulley, a chain belt, a tensioner mechanism, and an electronic control unit. The primary pulley includes a first moving sheave. The first moving sheave is configured to be non-rotatable relative to a first fixed sheave and an input shaft. The first moving sheave is configured to move in an axis direction. The first fixed sheave is fixed to the input shaft. The secondary pulley includes a second moving sheave. The second moving sheave is configured to be non-rotatable relative to a second fixed sheave and an output shaft. The second moving sheave is configured to move in the axis direction. The second fixed sheave is fixed to the output shaft. The chain belt is wound on the primary pulley and the secondary pulley. The tensioner mechanism includes a hydraulic pressure sensor, a head, and an actuator. The tensioner mechanism is configured to press a chord portion only when the chain belt extends by a predetermined amount or more. The chord portion is a part of the chain belt, the part being not wound on the pulleys. The hydraulic pressure sensor is configured to detect a magnitude of a hydraulic pressure to move the second moving sheave in the axis direction. The head is placed so as to be opposed to the chord portion. The actuator is configured to move the head in a direction where the chord portion is pressed. The electronic control unit is configured to continuously change a driving torque on an input-shaft side and to output the driving torque toward an output-shaft side by continuously changing respective winding radiuses of the chain belt with respect to the pulleys. When the magnitude of the hydraulic pressure detected by the hydraulic pressure sensor is a first predetermined value or more, the electronic control unit is configured to operate the actuator to press the chord portion such that the winding radiuses of the chain belt are maintained and a raceway length of the chain belt is made longer than a raceway length of the chain belt before the pressing by a predetermined amount or more. The predetermined amount is a circumferential extension amount of the chain belt when the magnitude of the hydraulic pressure is the first predetermined value.

With the above configuration, when the magnitude of the hydraulic pressure detected by the hydraulic pressure sensor is the first predetermined value or more, the chord portion of the chain belt is pressed, such that the winding radiuses of the chain belt with respect to the pulleys are maintained and the raceway length of the chain belt is lengthened by the predetermined amount or more. Accordingly, it is possible to restrain the chain belt from coming off from the sheave even in a low vehicle speed range at a low cost. Further, as a result of this, the winding radius of the chain belt with respect to the secondary pulley at the time of a low load can be set large. Hereby, it is possible to increase a range where a transmission ratio can be changed and to restrain a fuel efficiency decrease or a driving torque decrease of the vehicle. That is, with the above configuration, it is possible to restrain the chain belt from coming off from the sheave even in the low vehicle speed range, at a low cost, without causing the fuel efficiency decrease and the driving torque decrease of the vehicle.

In the variable transmission system for the vehicle, the chain belt may include a plurality of plate-shaped links, and a plurality of pins. Each of the links may have a communicating bole. Each of the pins may be configured to be fitted in the communicating holes so as to connect the links to each other annularly. The pins may be configured such that both end surfaces make contact with the pulleys so as to serve as power transmission surfaces. The head may be configured by a roller member and may be configured to press the pins by a projection portion. The roller member may be a member having a circular column shape and having a rotating axis in a direction perpendicular to a moving direction of the chain belt. The projection portion may be provided in an axial end of the roller member so as to project in a radial direction.

With the above configuration, it is possible to reduce a contact area between the head and the chain belt at the time of the pressing, thereby making it possible to restrain a decrease in a transmission torque of the chain belt at the time of the pressing.

In the variable transmission system for the vehicle, the actuator may communicate with an oil passage via a control valve and may be configured such that, when the magnitude of the hydraulic pressure reaches a second predetermined value or more, the hydraulic pressure is supplied to the actuator from the oil passage via the control valve such that the actuator operates. The oil passage may be an oil passage configured to supply the hydraulic pressure to the second moving sheave.

With the above configuration when a high load state occurs due to an occurrence of an on-fail failure in a hydraulic system for supplying the hydraulic pressure to the second moving sheave, the raceway length of the chain belt is lengthened without using an output of the hydraulic pressure sensor, thereby making it possible to absorb the extension of the chain belt in the circumference direction and to restrain the chain belt from coming off from the sheave.

In the variable transmission system for the vehicle, the head may be configured not to abut with the chain belt when the actuator does not operate.

With the above configuration, since the head does not abut with the chain belt at the time when the actuator does not operate, it is possible to restrain a decrease of torque transfer efficiency of the chain belt at the time when the actuator is inactive.

In the variable transmission system for the vehicle, the head may be placed so as to be opposed to the chord portion on a side where the chain belt is sent from the primary pulley toward the secondary pulley.

With the above configuration, in comparison with a case where the head is placed so as to be opposed to the chord portion on a side where the chain belt is sent from the secondary pulley to the primary pulley, it is possible to reduce a load to the actuator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a schematic view illustrating a configuration of a hydraulic control unit in one embodiment of the present disclosure;

FIG. 4A is a schematic view illustrating a configuration of the variable transmission system for the vehicle at the time when a head does not abut with a chord portion;

FIG. 4B is a schematic view illustrating a configuration of the variable transmission system for the vehicle at the time when the head presses the chord portion;

FIG. 5 is a flowchart illustrating a flow of a raceway length control process in one embodiment of the present disclosure;

DETAILED DESCRIPTION OF EMBODIMENTS

The following describes a configuration of a variable transmission system for a vehicle in one embodiment of the present disclosure and an operation thereof with reference to the drawings.

Figure 1:
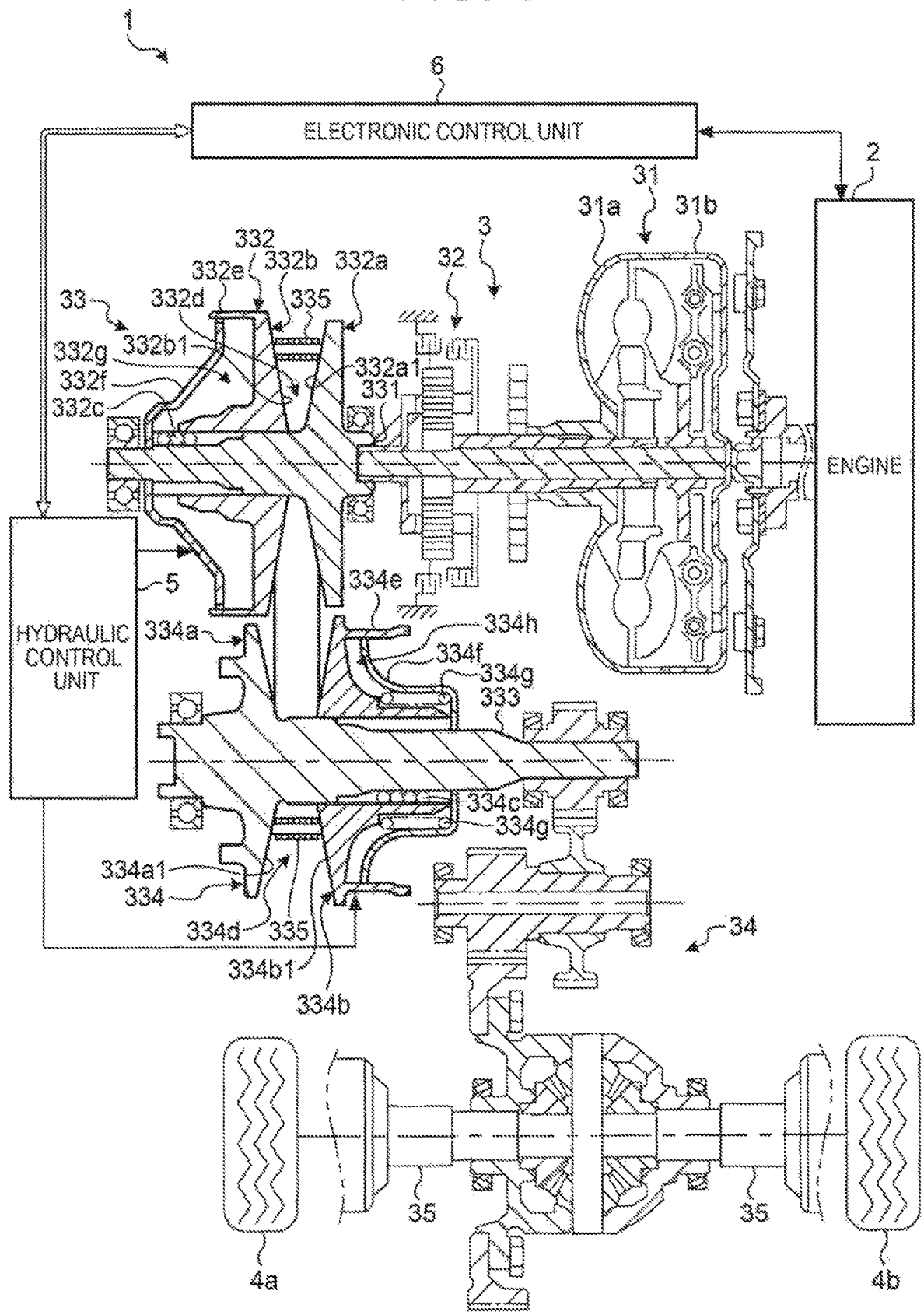
FIG. 1 is a schematic view illustrating a configuration of a vehicle to which a variable transmission system for a vehicle in one embodiment of the present disclosure is applied.

First, with reference to FIG. 1, the following describes a configuration of a vehicle to which the variable transmission system for the vehicle is applied.

FIG. 1 is a schematic view illustrating the configuration of the vehicle to which the variable transmission system for the vehicle in one embodiment of the present disclosure is applied. As illustrated in FIG. 1, a vehicle 1 includes an engine 2, a transaxle 3, a pair of driving wheels 4A, 4B, a hydraulic control unit 5, and an electronic control unit (ECU) 6, as main constituents.

The engine 2 is similar to a power source provided in a general vehicle, and an internal combustion engine such as a gasoline engine, a diesel engine, or a natural gas engine, an electric motor, a mechanism using an internal combustion engine and an electric motor in combination, or the like can be employed.

The transaxle 3 includes a torque converter 31, a forward/backward-movement switching unit 32, a continuously variable transmission 33, a power transmission mechanism 34, and an axle 35, and transmits a driving torque input from the engine 2 to the pair of driving wheels 4A, 4B attached to both ends of the axle 35.

The torque converter 31 is a hydraulic power transmission equipped with a lock-up clutch, and includes a pump impeller 31a to which the driving torque is input from the engine 2, and a turbine runner 31b to which the driving torque is transmitted from the pump impeller 31a via a fluid. The torque converter 31 transmits the driving torque input from the engine 2 via the fluid to the forward/backward-movement switching unit 32.

The forward/backward-movement switching unit 32 is a device for changing a rotation direction of an output shaft of the torque converter 31 between a forward direction and a reverse direction.

The continuously variable transmission 33 is a device for continuously changing a driving torque on a primary-shaft-331 side by the chain belt 335 so as to output the driving torque to a secondary-shaft-333 side. The chain belt 335 is provided between the primary shaft 331 (an input shaft) and the secondary shaft 333 (an output shaft). The primary shaft 331 is an output shaft of the forward/backward-movement switching unit 32. The secondary shaft 333 is connected to the axle 35 via the power transmission mechanism 34. A configuration of the continuously variable transmission 33 will be described later in detail.

The power transmission mechanism 34 transmits a driving torque input from the continuously variable transmission 33 to the pair of driving wheels 4A, 4B attached to both ends of the axle 35.

The hydraulic control unit 5 supplies a hydraulic pressure to a hydraulic chamber of the continuously variable transmission 33 in accordance with a control order from the ECU 6. A configuration of the hydraulic control unit 5 will be described later in detail.

The ECU 6 is constituted by an information processor such as a microcomputer, and has a function to control an operation of the whole vehicle 1.

Referring now to FIGS. 1 and 2, the configuration of the continuously variable transmission 33 is described in detail.

As illustrated in FIG. 1, the continuously variable transmission 33 includes: the primary shaft 331 to which a driving torque is transmitted from the forward/backward-movement switching unit 32; a primary pulley 332 connected to the primary shaft 331; the secondary shaft 333 that transmits the driving torque to the power transmission mechanism 34; a secondary pulley 334 connected to the secondary shaft 333; and a chain belt 335 without ends. Note that the primary shaft 331 and the secondary shaft 333 are placed in parallel to each other.

The primary pulley 332 is constituted by a first fixed sheave 332a having a conical shape and a first moving sheave 332b. The first fixed sheave 332a is formed integrally with the primary shaft 331. The first moving sheave 332b is engaged with the primary shaft 331 via a ball spline 332c so as not to be rotatable relative to the primary shaft 331 and to be movable in an axis direction of the primary shaft 331. Conical surfaces 332a1, 332b1 of the first fixed sheave 332a and the first moving sheave 332b are placed so as to be opposed to each other in the axis direction of the primary shaft 331, and a first V-groove 332d is formed by the conical surfaces 332a1, 332b1.

A primary cylinder 332e projecting toward a back-face side (a left direction in the figure) is formed on an outer periphery of the first moving sheave 332b, and a first piston 332f that liquid-tightly makes contact with an inner peripheral surface of the primary cylinder 332e is fitted to the primary shaft 331. When the primary cylinder 332e and the first piston 332f are formed as such, a space (hereinafter referred to as a first hydraulic chamber) 332g covered with these members is maintained liquid-tightly. By supplying oil into the first hydraulic chamber 332g, the first moving sheave 332b can be pressed toward the first fixed sheave 332a.

The secondary pulley 334 is constituted by a second fixed sheave 334a having a conical shape and a second moving sheave 334b. The second fixed sheave 334a is formed integrally with the secondary shaft 333. The second moving sheave 334b is engaged with the secondary shaft 333 via a ball spline 334c so as not to be rotatable relative to the secondary shaft 333 and to be movable in an axis direction of the secondary shaft 333. Conical surfaces 334a1, 334b1 of the second fixed sheave 334a and the second moving sheave 334b are placed so as to be opposed to each other in the axis direction of the secondary shaft 333, and a second V-groove 334d is formed by the conical surfaces 334a1, 334b1.

A secondary cylinder 334e projecting toward a back-face side (a right direction in the figure) is formed on an outer periphery of the second moving sheave 334b, and a second piston 334f that liquid-tightly makes contact with an inner peripheral surface of the secondary cylinder 334e is fitted to the secondary shaft 333. Further, a return spring 334g that presses the second moving sheave 334b toward the second fixed sheave 334a is provided between the second moving sheave 334b and the second piston 334f. When the secondary cylinder 334e and the second piston 334f are formed as such, a space (hereinafter referred to as a second hydraulic chamber) 334h covered with these members is maintained liquid-tightly. Accordingly, by supplying oil into the second hydraulic chamber 334h, the second moving sheave 334b can be pressed toward the second fixed sheave 334a.

Figure 2A:
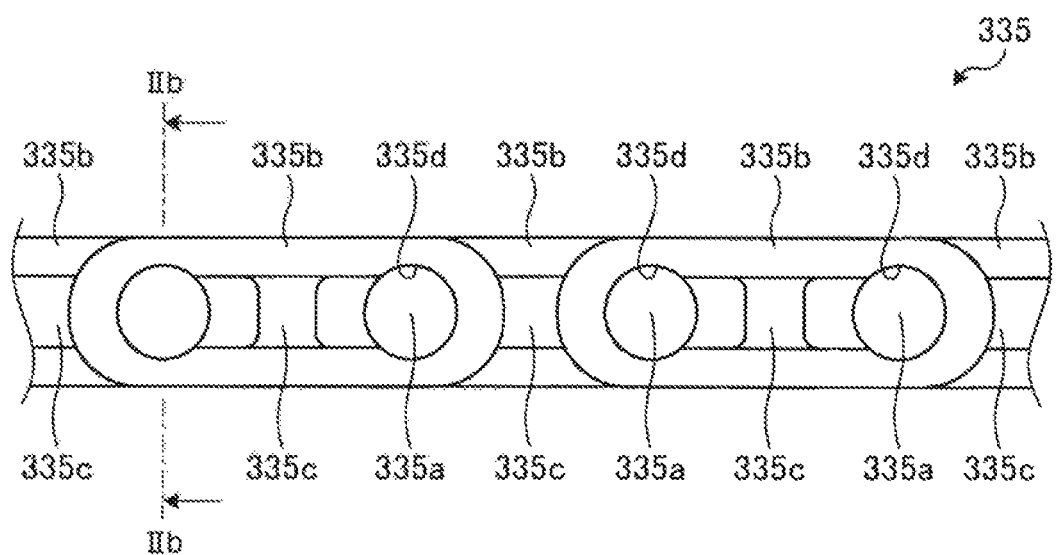
FIG. 2A is a schematic view illustrating a configuration of a chain belt in one embodiment of the present disclosure.
Figure 2B:
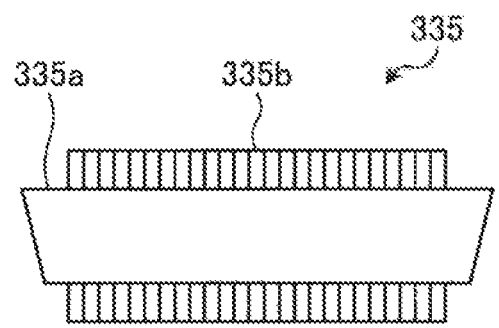
FIG. 2B is a sectional view taken along a line IIb-IIb in FIG. 2A.

The chain belt 335 is wound on the first V-groove 332d of the primary pulley 332 and the second V-groove 334d of the secondary pulley 334. Here, with reference to FIGS. 2A and 2B, the following describes one exemplary configuration of the chain belt 335. FIG. 2A is a schematic view illustrating a configuration of the chain belt in one embodiment of the present disclosure, and FIG. 2B is a sectional view taken along a line IIb-IIb in FIG. 2A. Note that a lateral direction in FIG. 2A indicates a longitudinal direction of the chain belt 335, and a vertical direction indicates a thickness direction of the chain belt 335.

As illustrated in FIG. 2A 2B, the chain belt 335 is constituted by a plurality of pins 335a formed to have the same length as a width of the chain belt 335 and placed in parallel to each other, and a plurality of links 335b annularly connected by the pins 335a. The link 335b is an annular board member having a communicating hole 335c into which the pin 335a is inserted, and includes pin holding portions 335d formed on both ends of the link 335b and having an inside diameter that is generally the same as an outer shape of the pin 335a.

More specifically, a width of a central portion sandwiched between the pin holding portions 335d is formed smaller than the outer shape of the pin 335a, so that the pin 335a does not move from the pin holding portion 335d in the longitudinal direction of the chain belt 335. The plurality of links 335b is laminated in a width direction of the chain belt 335 and the links 335b adjacent to each other are placed so as to be shifted to each other in the longitudinal direction of the chain belt 335 just by a distance between the pin holding portions 335d. After that, the pins 335a are into the pin holding portions 335d so that both ends of the pins 335a project in the width direction from the links 335b thus laminated. Thus, the links 335b are connected to each other annularly. Note that the links 335b and the pin 335a are configured so as to be rotatable relative to each other. Further, when an excessive driving torque is input, a length of the chain belt 335 extends temporarily, but when the input of the excessive driving torque is gone, the chain belt 335 is returned to an original length.

In the continuously variable transmission 33 having the above configuration, a driving torque is transmitted to the first fixed sheave 332a and the first moving sheave 332b from the forward/backward-movement switching unit 32 via the primary shaft 331. The driving torque transmitted to the first fixed sheave 332a and the first moving sheave 332b is transmitted to the second fixed sheave 334a and the second moving sheave 334b by frictional forces generated between the conical surfaces 332a1, 332b1 and the end surfaces of the pins 335a of the chain belt 335, and the driving torque is transmitted to the power transmission mechanism 34 via the secondary shaft 333.

As described above, the driving torque is transmitted by the frictional force between the chain belt 335 and each of the first fixed sheave 332a and the first moving sheave 332b, and the driving torque is also transmitted by the frictional force between the chain belt 335 and each of the second fixed sheave 334a and the second moving sheave 334b. On this account, a hydraulic pressure is supplied to the second hydraulic chamber 334h so as to generate the frictional force. More specifically, the hydraulic pressure is increased so as to increase a load to press the second moving sheave 334b. When the hydraulic pressure is increased, a clamping pressure for the second fixed sheave 334a and the second moving sheave 334b to sandwich the chain belt 335 is increased. As a result, a tensile force of the chain belt 335 is increased, so that the frictional forces of the chain belt 335 with respect to the first fixed sheave 332a and the first moving sheave 332b are increased, and the frictional forces of the chain belt 335 with respect to the second fixed sheave 334a and the second moving sheave 334b are increased.

Further, the continuously variable transmission 33 is configured such that a transmission ratio is changeable by changing winding radiuses of the chain belt 335 wound on the primary pulley 332 and the secondary pulley 334. More specifically, the continuously variable transmission 33 is configured to control an oil amount to be supplied to the first hydraulic chamber 332g in accordance with a requested transmission ratio and to move the first moving sheave 332b in the axis direction, so as to change a groove width of the first V-groove 332d, thereby changing gears. Note that a circumference length of the chain belt 335 is uniform in a normal time, and the chain belt 335 is pressed toward the second moving sheave 334b. Accordingly, by changing the groove width of the first V-groove 332d, a groove width of the second V-groove 334d changes accordingly.

Further, as mentioned earlier, when the transmission ratio is changed, the winding radiuses of the chain belt 335 are changed. Accordingly, in accordance with the transmission ratio, a position where the pins 335a start to make contact with the first V-groove 332d between the first fixed sheave 332a and the first moving sheave 332b, or a position where the second V-groove 334d between the second fixed sheave 334a and the second moving sheave 334b starts to make contact with the pins 335a is changed. Similarly, in accordance with the transmission ratio, a position where the pins 335a come off from the first V-groove 332d between the first fixed sheave 332a and the first moving sheave 332b, or a position where the pins 335a come off from the second V-groove 334d between the second fixed sheave 334a and the second moving sheave 334b is changed.

Referring now to FIG. 3, the following describes the configuration of the hydraulic control unit 5.

FIG. 3 is a schematic view illustrating the configuration of the hydraulic control unit 5 in one embodiment of the present disclosure. As illustrated in FIG. 3, the hydraulic control unit 5 in one embodiment of the present disclosure includes an oil pump P. The oil pump P functions as a hydraulic pressure source for a mechanical oil pump driven by a driving torque transmitted from a power transmission device (not shown) or an electrically-driven oil pump driven by an electric motor (not shown), and the like. The oil pump P pumps up oil accumulated in an oil pan 51 and supplies the oil to the first hydraulic chamber 332g and the second hydraulic chamber 334h.

The hydraulic control unit 5 includes a primary regulator valve 53 for adjusting a hydraulic pressure in an oil passage 52 through which the oil discharged from the oil pump P flows. The primary regulator valve 53 is configured to control the hydraulic pressure in the oil passage 52 in accordance with a signal pressure $P_{SLT}$ output from a solenoid valve SLT, and when the hydraulic pressure in the oil passage 52 is higher than a hydraulic pressure corresponding to the signal pressure $P_{SLT}$, the primary regulator valve 53 is opened so as to discharge the oil in the oil passage 52. The oil discharged from the oil passage 52 by the primary regulator valve 53 being opened is returned to the oil pan 51 or is supplied to a lubrication portions (LUB) such as a meshing portion of a gear, a frictional contacting portion, and the like. Note that, in the following description, the hydraulic pressure adjusted by the primary regulator valve 53 may be referred to as a line pressure $P_L$.

The hydraulic control unit 5 is configured to supply the line pressure $P_L$ to a modulator valve 54 for further adjusting the line pressure $P_L$ to a uniform pressure $P_M$, a first control valve 55 for controlling a hydraulic pressure in the first hydraulic chamber 332g, and a second control valve 56 for controlling a hydraulic pressure in the second hydraulic chamber 334h. The oil output from the modulator valve 54 is supplied to the first control valve 55 and the second control valve 56, or to solenoid valves SLS, SLP, SLC, SLT for outputting signal pressures to the primary regulator valve 53 and the like, and a control valve 58 for controlling a hydraulic pressure of a clutch 57.

The first control valve 55 is a pressure control valve configured to cause the oil passage 52 to communicate with the first hydraulic chamber 332g and discharge (EX) the oil in the first hydraulic chamber 332g to the oil pan 51 in response to a signal pressure $P_{SLP}$ output from the solenoid valve SLP. That is, the first control valve 55 is configured to output a hydraulic pressure adjusted with the line pressure $P_L$ as a source pressure in response to the signal pressure $P_{SLP}$ output from the solenoid valve SLP, so as to control the hydraulic pressure in the first hydraulic chamber 332g. The signal pressure $P_{SLP}$ is controlled by control of a magnitude of a current applied by the ECU 6 to the solenoid valve SLP. By controlling the hydraulic pressure in the first hydraulic chamber 332g, the transmission ratio of the continuously variable transmission 33 can be controlled.

The second control valve 56 is a pressure control valve configured to cause the oil passage 52 to communicate with the second hydraulic chamber 334h and discharge (EX) the oil in the second hydraulic chamber 334h to the oil pan 51 in response to a signal pressure $P_{SLS}$ output from the solenoid valve SLS. That is, the second control valve 56 is configured to output a hydraulic pressure adjusted with the line pressure $P_L$ as a source pressure in response to the signal pressure $P_{SLS}$ output from the solenoid valve SLS, so as to control the hydraulic pressure in the second hydraulic chamber 334h. The signal pressure $P_{SLS}$ is controlled by control of a magnitude of a current applied by the ECU 6 to the solenoid valve SLS. By controlling the hydraulic pressure in the second hydraulic chamber 334h, a tensile force of the chain belt 335 and a transmission torque capacity of the continuously variable transmission 33 can be controlled.

Referring now to FIGS. 4A to 12, the following describes the configuration of the variable transmission system for the vehicle in one embodiment of the present disclosure and an operation thereof.

First, with reference to FIGS. 4A, 4B, the following describes the configuration of the variable transmission system for the vehicle in one embodiment of the present disclosure.

FIGS. 4A, 4B are schematic views illustrating the configuration of the variable transmission system for the vehicle in one embodiment of the present disclosure. As illustrated in FIGS. 4A, 4B, the variable transmission system 7 for the vehicle in one embodiment of the present disclosure (hereinafter referred to as the variable transmission system 7) includes a tensioner mechanism 71, a hydraulic pressure sensor 72, and a controlling portion 73.

The tensioner mechanism 71 is placed near a chord portion 335e of the chain belt 335, the chord portion 335e being a part not wound on the primary pulley 332 and the secondary pulley 334, and includes a head 71a and an actuator 71b. The head 71a is constituted by a roller member having a circular column shape and including a rotating shaft in a direction perpendicular to a moving direction of the chain belt 335, and is placed so as to be opposed to the chord portion 335e. The actuator 71b is constituted by an electrically-driven or hydraulic actuator. The actuator 71b moves the head 71a between a position (FIG. 4A) where the head 71a does not abut with the chord portion 335e and a position (FIG. 4B) where the head 71a presses the chord portion 335e, so as to adjust a raceway length of the chain belt 335 while maintaining winding radiuses of the chain belt 335 with respect to the pulleys. When the actuator 71b is inactive, the head 71a does not abut with the chain belt 335. Accordingly, it is possible to restrain a decrease of torque transfer efficiency of the chain belt 335 at the time when the actuator 71b is inactive.

The hydraulic pressure sensor 72 detects a hydraulic pressure in the second hydraulic chamber 334h of the secondary pulley 334, and outputs an electrical signal indicative of the hydraulic pressure thus detected to the controlling portion 73.

FIGS. 4A, 4B illustrating the controlling portion 73 schematically illustrate a function to control an operation of the whole variable transmission system 7 to be performed by the ECU 6.

In the variable transmission system 7 having such a configuration, when the following raceway length control process is executed, the chain belt 335 extends in the circumference direction due to a tensile force at the time of a high load. This accordingly makes it possible to restrain the chain belt 335 from running onto outer peripheral surfaces of the primary pulley 332 and the secondary pulley 334 and coming off from the primary pulley 332 and the secondary pulley 334. Note that, in the present specification, the time of a high load indicates a time when a driving torque equal to or higher than a predetermined value is input into the continuously variable transmission 33, and occurs in a stall state or an on-fail state of a hydraulic system. Further, the stall state indicates a state where lock-up of the torque converter is released and a rotation of the output shaft is stopped in a state where a torque is amplified, so that a difference between input and output rotations of the torque converter becomes very large and a torque amplification factor becomes very high. The stall occurs at the time when the vehicle runs over a large bump from a state where the vehicle stops or at the moment when the vehicle starts to move by strongly stepping an accelerator from the stop state. The following describes the operation of the variable transmission system 7 at the time when the raceway length control process is executed.

FIG. 5 is a flowchart illustrating a flow of the raceway length control process in one embodiment of the present disclosure. The flowchart illustrated in FIG. 5 starts at a timing when an ignition switch of the vehicle 1 is changed from an OFF state to an ON state, and the raceway length control process proceeds to a process of step S1.

In the process of step S1, the controlling portion 73 detects a hydraulic pressure in the second hydraulic chamber 334h via the pressure sensor 72. The controlling portion 73 determines whether or not the hydraulic pressure in the second hydraulic chamber 334h is a predetermined threshold (a first predetermined value) or more. Here, the predetermined threshold is a value set in advance based on a hydraulic pressure in the second hydraulic chamber 334h at the time when a circumferential extension amount of the chain belt 335 reaches its tolerable amount. As a result of the determination, when the hydraulic pressure is the predetermined threshold or more (step S1: Yes), the controlling portion 73 determines that the continuously variable transmission 33 is in a high load state, and the raceway length control process proceeds to a process of step S2. In the meantime, when the hydraulic pressure is less than the predetermined threshold (step S1: No), the controlling portion 73 determines that the continuously variable transmission 33 is not in the high load state, and finishes the raceway length control process. Note that, in a case where the raceway length control process is finished, the controlling portion 73 executes the raceway length control process again after a predetermined time elapses, while the ignition switch of the vehicle 1 is in the ON state.

In the process of step S2, the controlling portion 73 calculates a circumferential extension amount ΔL of the chain belt 335 based on the hydraulic pressure in the second hydraulic chamber 334h, detected in the process of step S1, so as to calculate a necessary raceway length of the chain belt 335 to absorb the extension amount ΔL thus calculated. Then, the controlling portion 73 calculates a necessary pushing amount of the head 71a to realize the raceway length thus calculated, namely, a stroke amount (a necessary stroke amount) ΔD of the actuator 71b. Here, the circumferential extension amount ΔL of the chain belt 335 is found with reference to a table showing a relationship between the hydraulic pressure in the hydraulic chamber 334h and the circumferential extension amount ΔL of the chain belt 335, the table being found in advance by experiment, analysis, and simple model calculation. A calculation method of the necessary stroke amount ΔD will be described later. Hereby, the process of step S2 is finished and the raceway length control process proceeds to a process of step S3.

In the process of step S3, the controlling portion 73 controls the actuator 71b so that the head 71a moves only by the necessary stroke amount ΔD calculated in the process of step S2, and hereby, the raceway of the chain belt 335 is drawn inward from the outside. With such a process, a raceway RT2 of the chain belt 335 illustrated in FIG. 4B is lengthened only by a length of not less than the circumferential extension amount ΔL of the chain belt 335 in comparison with a raceway RT1 of the chain belt 335 before the pressing, while the winding radiuses of the chain belt 335 with respect to the pulleys are maintained. As a result, the circumferential extension amount ΔL of the chain belt 335 is absorbed by the extension of the raceway length of the chain belt 335, thereby making it possible to restrain the chain belt 335 from coming off from the primary pulley 332 and the secondary pulley 334. Note that, in the present embodiment, the raceway length of the chain belt 335 is controlled by the control of the necessary stroke amount ΔD of the actuator 71b. However, a necessary load of the head 71a to realize the raceway length thus calculated may be found so as to control the raceway length of the chain belt 335 by controlling a load to the head 71a. Hereby, the process of step S3 is completed, and the raceway length control process is returned to the process of step S1.

As is apparent from the above description, the variable transmission system 7 in one embodiment of the present disclosure is configured such that, when a magnitude of the hydraulic pressure detected by the hydraulic pressure sensor 72 is the predetermined threshold or more, the chord portion 335e of the chain belt 335 is pressed, so that the winding radiuses of the chain belt 335 with respect to the pulleys are maintained, and the raceway length of the chain belt 335 is lengthened by at least the circumferential extension amount ΔL of the chain belt 335 at the time when the magnitude of the hydraulic pressure is the predetermined threshold. Accordingly, it is possible to restrain the chain belt 335 from coming off from the sheave even in a low vehicle speed range, at a low cost. Further, as a result of this, the winding radius of the chain belt 335 with respect to the secondary pulley 334 at the time of a low load can be set lame, so that a range where the transmission ratio can be changed increases, thereby making it possible to restrain a fuel efficiency decrease or a driving torque decrease of the vehicle 1. That is, with the variable transmission system 7 in one embodiment of the present disclosure, it is possible to restrain the chain belt 335 from coming off from the sheave even in the low vehicle speed range, at a low cost, without causing the fuel efficiency decrease and the driving torque decrease of the vehicle 1.

Note that, in the present embodiment, as illustrated in FIGS. 4A, 4B, the tensioner mechanism 71 is placed so as to be opposed to the chord portion (a loose-side chord portion) 335e on a side where the chain belt 335 is sent from the primary pulley 332 toward the secondary pulley 334. However, it is conceivable that the tensioner mechanism 71 is placed so as to be opposed to a chord portion (a tension-side chord portion) 335f on a side where the chain belt 335 is sent from the secondary pulley 334 toward the primary pulley 332. However, generally, a tensile force of the chord portion 335f is larger than a tensile force of the chord portion 335e. On this account, a load necessary to realize the same pushing amount of the chain belt 335 is larger in the chord portion 335f side than the chord portion 335e side. On this account, from the viewpoint of the load to the tensioner mechanism 71, it is desirable for the tensioner mechanism 71 to be placed so as to be opposed to the chord portion 335e side.

Further, in the present embodiment, the tensioner mechanism 71 is placed only on the chord portion 335e side. However, the tensioner mechanism 71 may be placed on both the chord portion 335e side and the chord portion 335f side. When the tensioner mechanism 71 is placed on both the chord portion 335e side and the chord portion 335f side, a necessary pressing amount of the chain belt 335 for the extension amount of the chain belt 335 to be absorbed by the extension amount of the raceway length can be shared with the tensioner mechanism 71 on the chord portion 335e side and the tensioner mechanism 71 on the chord portion 335f side. As a result, a load to each of the tensioner mechanisms 71 can be reduced.

Figure 6:
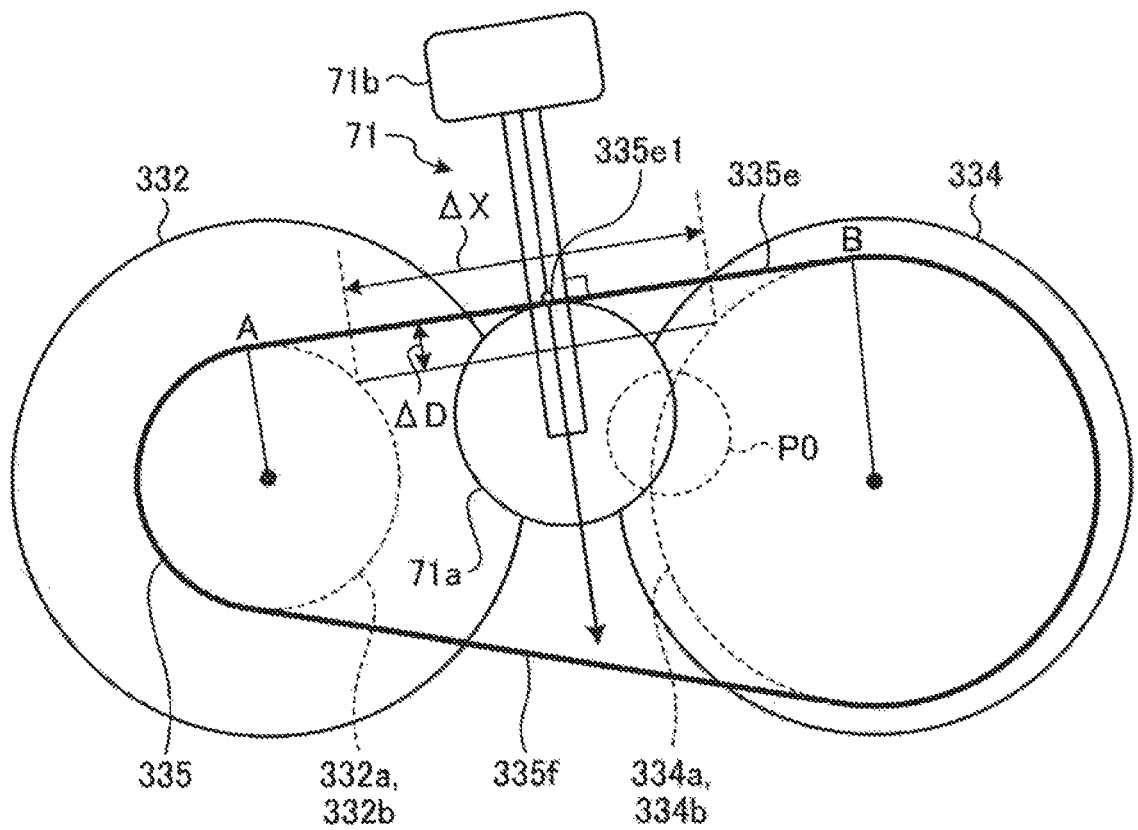
FIG. 6 is a schematic view to describe a pushing position of the chain belt by the head.

Further, as illustrated in FIG. 6, it is desirable that a central position of the actuator 71b be placed at a position where the head 71a presses a central part 335e1 of the chord portion 335e from a perpendicular direction. However, depending on the head 71a or a magnitude of the necessary stroke amount ΔD, the head 71a interferes with the second fixed sheave 334a and the second moving sheave 334b constituting the secondary pulley 334, as illustrated in a region P1. Accordingly, the chain belt 335 might be sandwiched by the head 71a, the second fixed sheave 334a, and the second moving sheave 334b.

Figure 7:
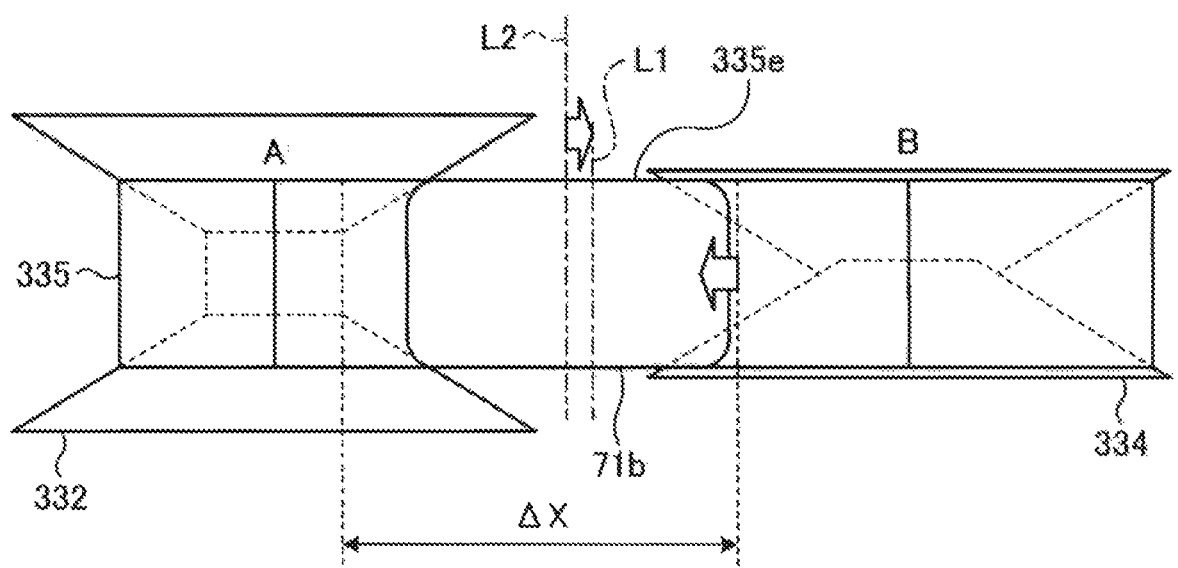
FIG. 7 is a schematic view to describe the pushing position of the chain belt by the head.

On this account, as illustrated in FIG. 7, it is desirable that a central position L2 of the actuator 71b be placed at a position as close as possible to a central position L1 of the chord portion 335e of the chain belt 335 within a range ΔX of the chord portion 335e. The range ΔX of the chord portion 335e is a range in which the chain belt 335 is not sandwiched by the head 71a, the second fixed sheave 334a, and the second moving sheave 334b, at the time when the head 71a is pushed by the necessary stroke amount ΔD.

Figure 8A:
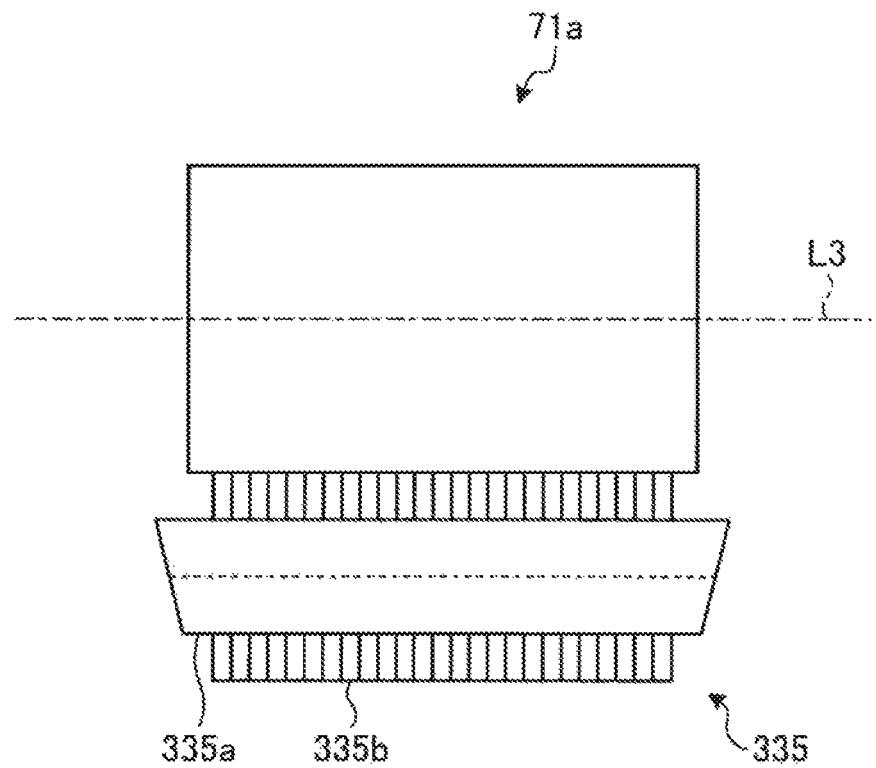
FIG. 8A is a schematic view to describe a contact position between the head and the chain belt.
Figure 8B:
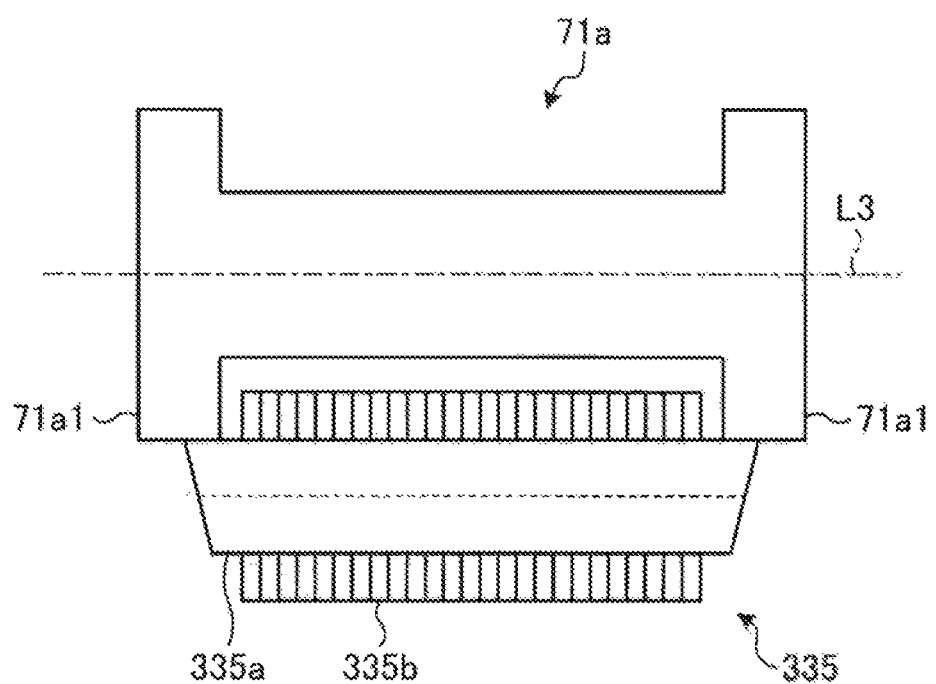
FIG. 8B is a schematic view to describe a modification of the contact position between the head and the chain belt.

Further, in the present embodiment, as illustrated in FIG. 8A, in order to reduce a dragging resistance, the head 71a is made of a roll member having a circular column shape and configured to rotate around a rotating shaft L3, and presses the link 335b of the chain belt 335 while rotating around the rotating shaft L3. However, as illustrated in FIG. 8B, a projection portion 71a1 projecting in a radial direction may be formed on a peripheral surface of an end of the head 71a in a rotating-shaft-L3 direction, so that the pin 335a of the chain belt 335 is pressed by the projection portion 71a1.

With such a configuration, it is possible to reduce a contact area between the head 71a and the chain belt 335, thereby making it possible to restrain a decrease in a transmission torque of the chain belt 335.

Figure 9A:
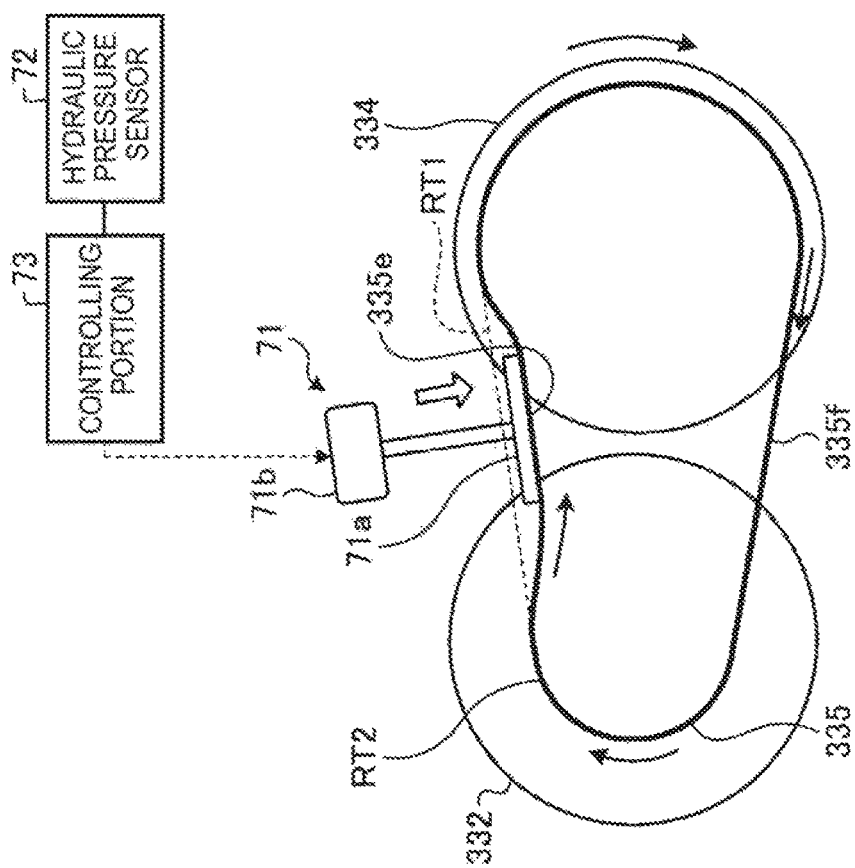
FIG. 9A is a schematic view illustrating a configuration of a modification of the variable transmission system for the vehicle at the time when the head illustrated in FIG. 4A does not abut with the chord portion.
Figure 9B:
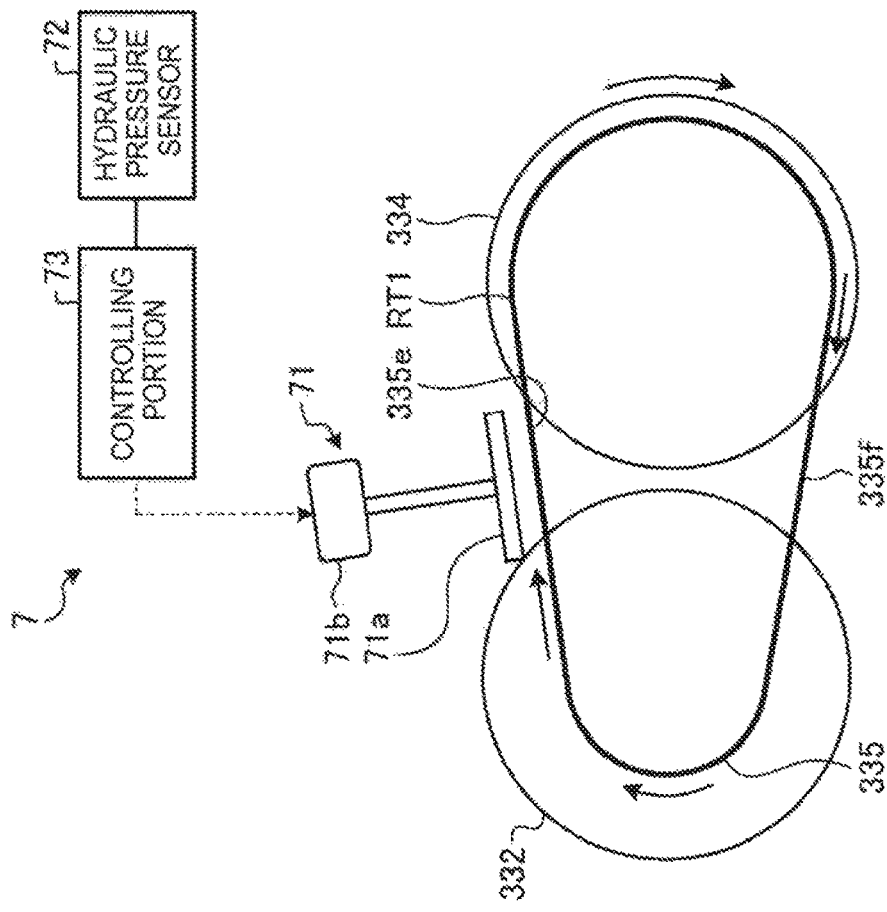
FIG. 9B is a schematic view illustrating a configuration of a modification of the variable transmission system for the vehicle at the time when the head illustrated in FIG. 4B presses the chord portion.

Further, in the present embodiment, the head 71a is made of a roll member having a circular column shape. However, as illustrated in FIGS. 9A, 9B, the head 71a may be constituted by a planar-shaped member such as a guide plate for restraining vibrations of the chain belt 335, so as to press the chain belt 335 in a planar manner. With such a configuration, the chain belt 335 can be pressed by use of an existing device such as a guide plate for the vibration restraint, thereby making it possible to restrain the chain belt 335 from coining off from the primary pulley 332 and the secondary pulley 334, at a lower cost.

Figure 10:
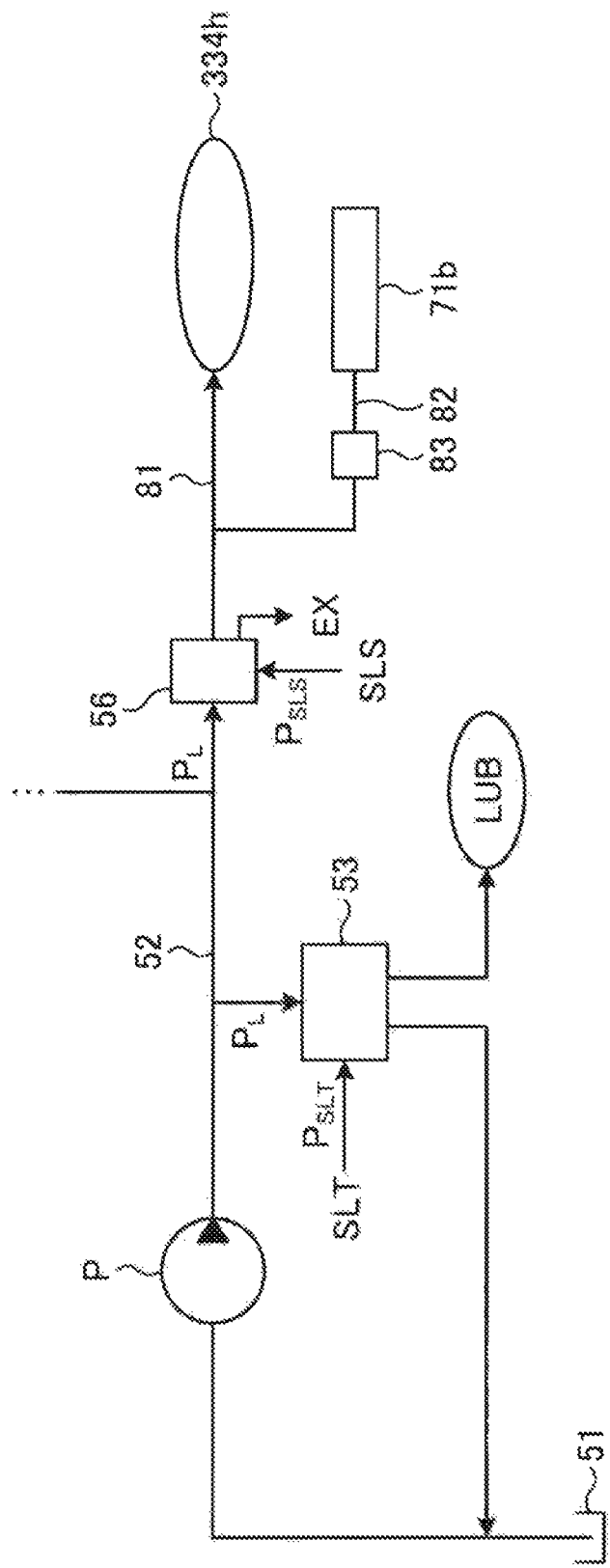
FIG. 10 is a schematic view illustrating a configuration of a modification of the hydraulic control unit illustrated in FIG. 3.

Further, as illustrated in FIG. 10, a bypass passage 82 communicating with the actuator 71b may be provided in an oil passage 81 for supplying a hydraulic pressure to the second hydraulic chamber 334h, and the bypass passage 82 may be provided with a check valve 83 (a control valve) for supplying the hydraulic pressure to the actuator 71b via the bypass passage 82 at the time when the hydraulic pressure in the oil passage 81 is a predetermined second threshold (a second predetermined value) or more. With such a configuration, as a first result or as a second result, even if a high load state is established and the extension occurs in the chain belt 335, it is possible to restrain the chain belt 335 from coming off from the secondary pulley 334 by extending the raceway length of the chain belt 335 by driving the actuator 71b. The first result is a result that both the primary regulator valve 53 and the second control valve 56 in the hydraulic control unit 5 have an on-fail failure, so that a high hydraulic pressure is directly supplied from the oil pump P to the second hydraulic chamber 334h. The second result is a result that the line pressure $P_L$ is directly supplied to the second hydraulic chamber 334h due to the on-fail failure of the second control valve 56 in the hydraulic control unit 5.

Finally, the following describes the calculation method of the necessary pushing amount ΔD of the chain belt 335 by the tensioner mechanism 71 in either of a case where a shape of the head 71a is a circular column shape as illustrated in FIG. 4 and a case where the shape is a planar shape as shown in FIG. 9A, FIG. 9B.

Figure 11:
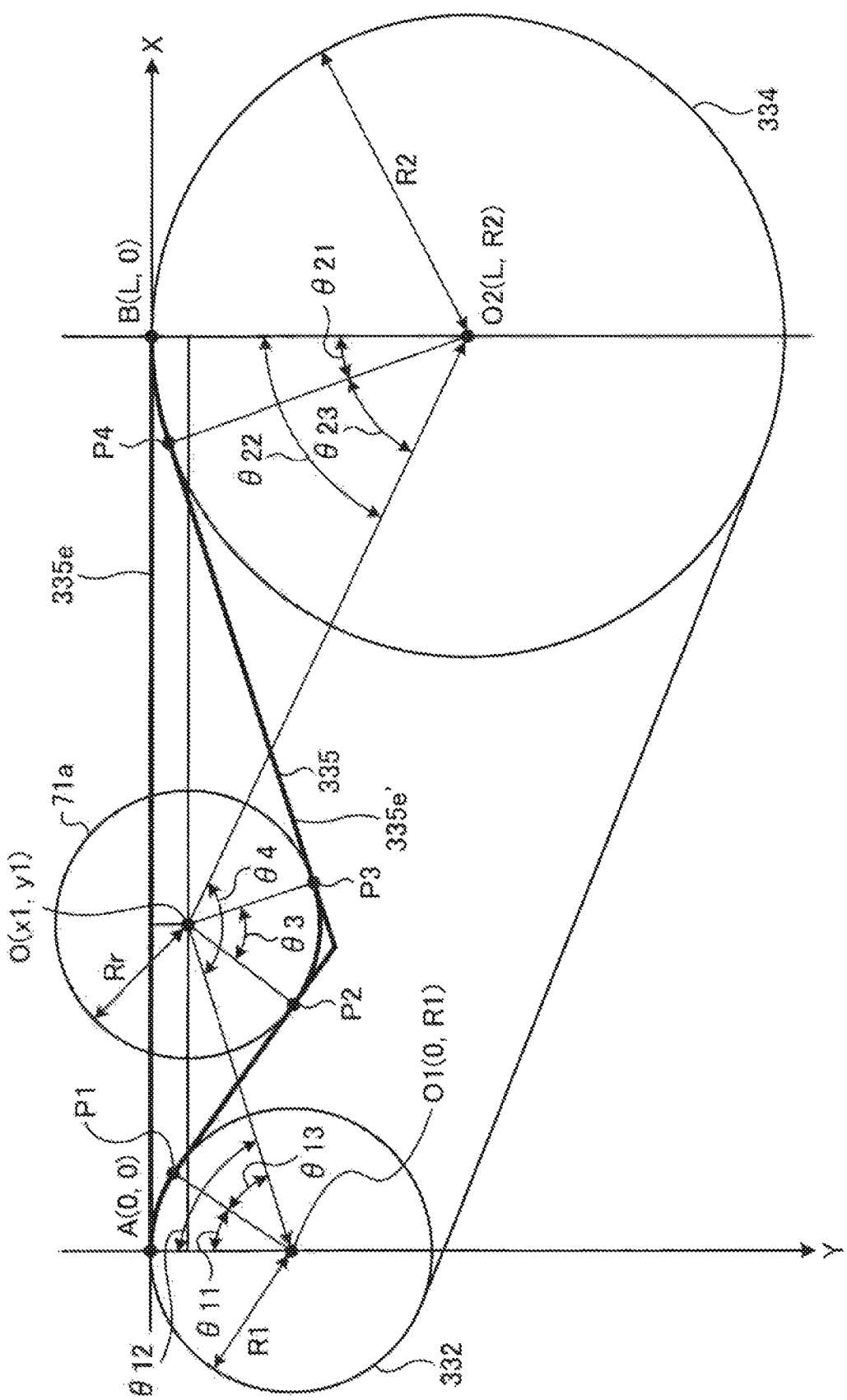
FIG. 11 is a schematic view to describe a calculation method of a necessary pushing amount of the chain belt by a tensioner mechanism in a case where a shape of the head is a circular column shape.

First, with reference to FIG. 11, the following describes a calculation method of a necessary pushing amount ΔD of the chain belt 335 by the tensioner mechanism 71 in a case where the shape of the head 71a is a circular column shape. FIG. 11 is a schematic view to describe the calculation method of the necessary pushing amount ΔD of the chain belt 335 by the tensioner mechanism 71 in a case where a shape of the head 71a is a circular column shape. Note that, in FIG. 11, an X-axis direction indicates a direction parallel to the chord portion 335e (a line segment AB) of the chain belt 335, and a Y-axis direction indicates a direction perpendicular to the X-axis direction and passing through an axis-center position O1(0, R1) of the primary pulley 332. Further, in the figure, O2(L, R2) and O(x1, y1) indicate respective central positions of the secondary pulley 334 and the head 71a (positions on a pitch line of the chain belt 335 in consideration of a distance between a contact position of the head 71a with respect to the chain belt 335 and the pitch line). R1, R2, Rr indicate respective radiuses of the primary pulley 332, the secondary pulley 334, and the head 71a.

When a length of the chord portion 335e (a line segment AB) when the chain belt 335 is not pressed by the tensioner mechanism 71 is assumed L, and a length of a raceway 335e of the chain belt 335 between a point A and a point B when the chain belt 335 is pressed by the tensioner mechanism 71 is assumed L', the axis-center position O(x1, y1) of the head 71a is moved so that the length L' of the raceway 335e' satisfies Mathematical Expression (1) shown below. Hereby, a circumferential extension amount ΔL of the chain belt 335 can be absorbed by the length L' of the raceway 335e'.

$$L'-L \geq \Delta L \quad (1)$$

Here, as shown in Mathematical Expression (2), the length L' of the raceway 335e' is found as a sum of respective lengths of a circular arc A_P1, a line segment P1_P2, a line segment P2_P3, a line segment P3_P4, and a circular arc P4_B illustrated in FIG. 11, and the respective lengths are geometrically found based on coordinate positions of the primary pulley 332, the secondary pulley 334, and the head 71a. Note that, in the following mathematical expressions, a unit of angles θ3, θ4, θ11, θ12, θ13, θ21, θ22, and θ23 is a radian. Accordingly, a length of the raceway length L' is calculated by use of Mathematical Expression (2) with the axis-center position O(x1, y1) of the head 71a being taken as a variable, and the axis-center position O(x1, y1) of the head 71a is found so as to satisfy the condition shown by Mathematical Expression (1). Hereby, the necessary pushing amount ΔD can be calculated.

$$L' = (A\_P1) + (P1\_P2) + (P2\_P3) + (P3\_P4) + (P4\_B) \quad (2)$$

Here, $(A\_P1) = 2 \cdot \pi \cdot R1 \cdot (\varnothing 11/(2 \cdot \pi))$ $(P1\_P2) = \sqrt{\{(O\_O1)\hat{}2 - (R1+Rr)\hat{}2\}}$ $(O\_O1) = \sqrt{\{(x1)\hat{}2 + (y1-R1)\hat{}2\}}$ $(P2\_P3) = 2 \cdot \pi \cdot Rr \cdot (\theta 3/(2 \cdot \pi))$ $(P3\_P4) = \sqrt{\{(O\_O2)\hat{}2 - (R2+Rr)\hat{}2\}}$ $(O\_O2) = \sqrt{\{(L-x1)\hat{}2 + (R2-y1)\hat{}2\}}$ $(P4\_B) = 2 \cdot \pi R2 \cdot (\theta 21/(2 \cdot \pi))$ $\theta 11 = \theta 12 - \theta 13$ $\theta 12 = \arcsin\{(x1)/(O\_O1)\}$ $\theta 13 = \arccos\{(R1+Rr)/(O\_O1)\}$ $\theta 21 = \theta 22 - \theta 23$ $\theta 22 = \arcsin\{(L-x1)/(O\_O2)\}$ $\theta 23 = \arccos\{(R2+Rr)/(O\_O2)\}$ $\theta 3 = \theta 4 - (\theta 12 + \theta 22)$ $\overline{O\_O1} = (-x1, R1-y1)$ $\overline{O\_O2} = (L-x1, R2-y1)$ $\overline{O\_O1} \cdot \overline{O\_O2} = |O\_O1| \cdot |O\_O2| \cdot \cos \theta 4$ Therefore, $$\theta 4 = \arccos\{(\overline{O\_O1} \cdot \overline{O\_O2})/(|O\_O1| \cdot |O\_O2|)\}$$
$$= \arccos\{(-x1 \cdot (L-x1) + (R1-y1) \cdot (R2-y1))/$$
$$(\sqrt{(x1^{\wedge}2 + (R1-y1)^{\wedge}2)} \cdot \sqrt{((L-x1)^{\wedge}2 + (R2-y1)^{\wedge}2)})\}$$

Figure 12:
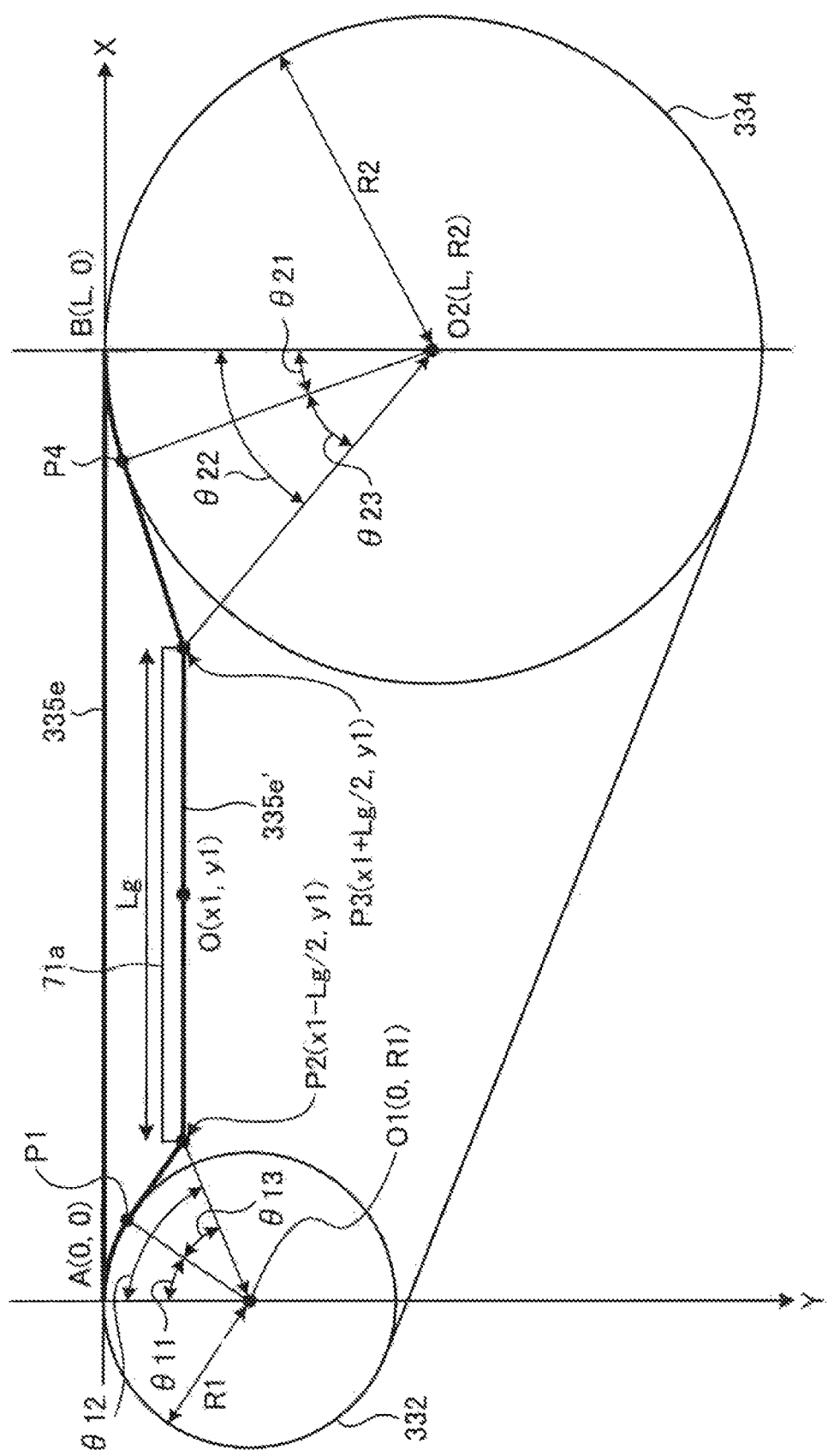
FIG. 12 is a schematic view to describe a calculation method of a necessary pushing amount of the chain belt by the tensioner mechanism in a case where the shape of the head is a planar shape.
Figure 13:
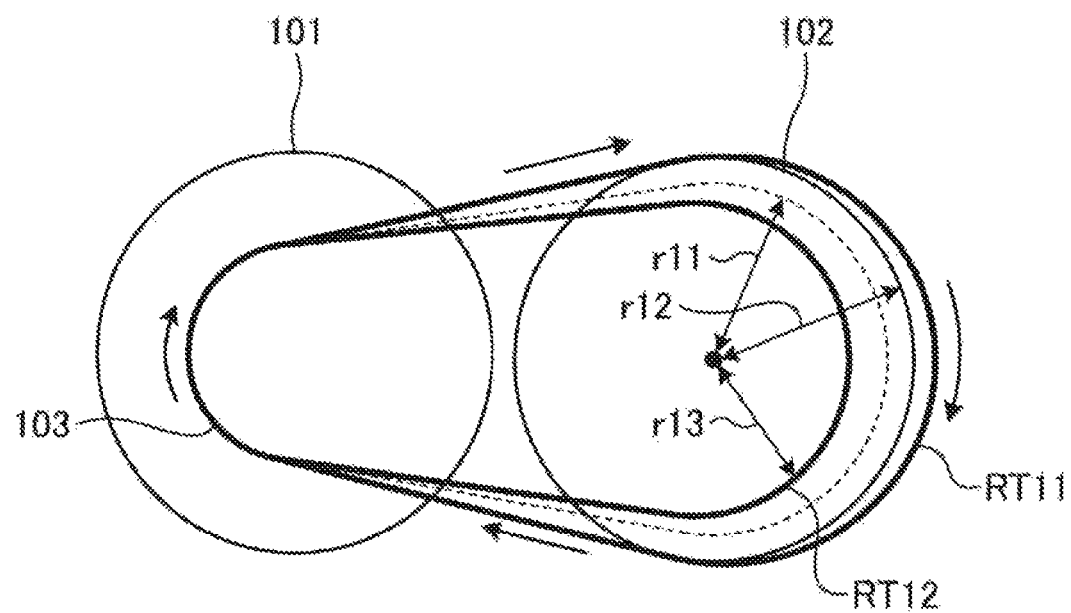
FIG. 13 is a schematic view to describe a problem in a chain-belt continuously variable transmission for a vehicle.

Referring now to FIG. 12, the following describes a calculation method of a necessary pushing amount ΔD of the chain belt 335 by the tensioner mechanism 71 in a case where the shape of the head 71a is a planar shape. FIG. 12 is a schematic view to describe the calculation method of the necessary pushing amount ΔD of the chain belt 335 by the tensioner mechanism 71 in the case where the shape of the head 71a is a planar shape. Note that, in FIG. 12, an X-axis direction indicates a direction parallel to the chord portion 335e (the line segment AB) of the chain belt 335, and a Y-axis direction indicates a direction perpendicular to the X-axis direction and passing through the axis-center position O1(0, R1) of the primary pulley 332. Further, in the figure, O2(L, R2) indicates an axis-center position of the secondary pulley 334 and O(x1, y1) indicates a central position of the head 71a (a position on a pitch line of the chain belt 335 in consideration of a distance between the pitch line and a contact position of the head 71a with the chain belt 335). Further, R1, R2 indicate respective radiuses of the primary pulley 332 and the secondary pulley 334. Further, a length of the head 71a is assumed Lg.

Similarly to the case where the shape of the head 71a is a circular column shape, in the case where the shape of the head 71a is a planar shape, when the central position O(x1, y1) of the head 71a is moved so that a length L' of a raceway 335e between a point A and a point B at the time when the chain belt 335 is pressed by the tensioner mechanism 71 satisfies Mathematical Expression (1), a circumferential extension amount ΔL of the chain belt 335 is absorbed by the length L' of the raceway 335e'. However, in the case where the shape of the head 71a is a planar shape, the length L' of the raceway 335e' is found as a sum of respective lengths of a circular arc A_P1, a line segment P1_P2, a line segment P2_P3, a line segment P3_P4, and a circular arc P4_B illustrated in FIG. 12, as shown in Mathematical Expression (3), and the respective lengths are geometrically found based on a positional relationship among the primary pulley 332, the secondary pulley 334. and the head 71a. Note that, in the following mathematical expression, a unit of angles θ3, θ4, θ11, θ12, θ13, θ21, Θ22, and θ23 is a radian. Accordingly, a length of the raceway length L' is calculated by use of Mathematical Expression (3) with the central position O(x1, y1) of the head 71a being taken as a variable, and the central position O(x1, y1) of the head 71a is found so as to satisfy the condition shown by Mathematical Expression (1). Hereby, the necessary pushing amount ΔD can be calculated.

$$L'=(A\_P1)+(P1\_P2)+(P2\_P3)+(P3\_P4)+(P4\_B) \quad (3)$$

Here, $$(A\_P1)=2 \cdot \pi \cdot R1 \cdot (\theta 11/(2 \cdot \pi))$$

$$(P1\_P2)=\sqrt{\{(O1\_P2)^2-R1^2\}}$$

$$(O1\_P2)=\sqrt{\{(x1-Lg/2)^2+(y1-R1)^2\}}$$

$$(P2\_P3)=Lg$$

$$(P3\_P4)=\sqrt{\{(O2\_P3)^2-R2^2\}}$$

$$(O2\_P3)=\sqrt{\{(L-(x1+Lg/2))^2+(R2-y1)^2\}}$$

$$(P4\_B)=2 \cdot \pi R2 \cdot (\theta 21/(2 \cdot \pi))$$

$$\theta 11=\theta 12-\theta 13$$

$$\theta 12=\arctan\{(R1-y1)/(x1-Lg/2)\}$$

$$\theta 13=\arcsin\{(P1\_P2)/(O1\_P2)\}$$

$$\theta 21=\theta 22-\theta 23$$

$$\theta 22=\arctan\{(R2-y1)/(L-(x1+Lg/2))\}$$

$$\theta 23=\arcsin\{(P3\_P4)/(O2\_P3)\}$$

The embodiment to which the disclosure accomplished by the inventors has been described as above, but the present disclosure is not limited by a description and a drawing, in the present embodiment, as a part of the disclosure of the disclosure. That is, the scope of the present disclosure includes all other embodiments, examples, operational techniques, and the like made by persons skilled in the art based on the present embodiment.

What is claimed is:

1. A variable transmission system for a vehicle, the variable transmission system comprising:
    a primary pulley including a first moving sheave, the first moving sheave being configured to be non-rotatable relative to a first fixed sheave and an input shaft, the first moving sheave configured to move in an axis direction, the first fixed sheave being fixed to the input shaft;
    a secondary pulley including a second moving sheave, the second moving sheave being configured to be non-rotatable relative to a second fixed sheave and an output shaft, the second moving sheave configured to move in the axis direction, the second fixed sheave being fixed to the output shaft;
    a chain belt wound on the primary pulley and the secondary pulley;
    a tensioner mechanism including a hydraulic pressure sensor, a head, and an actuator,
        the tensioner mechanism being configured to press a chord portion only when the chain belt extends by a predetermined amount or more, the chord portion being a part of the chain belt, the part being not wound on the pulleys,
        the hydraulic pressure sensor being configured to detect a magnitude of a hydraulic pressure to move the second moving sheave in the axis direction,
        the head being placed so as to be opposed to the chord portion,
        the actuator being configured to move the head in a direction where the chord portion is pressed; and
    an electronic control unit configured to continuously change a driving torque on an input-shaft side and to output the driving torque toward an output-shaft side by continuously changing respective winding radiuses of the chain belt with respect to the pulleys,
    when the magnitude of the hydraulic pressure detected by the hydraulic pressure sensor is a first predetermined value or more, the electronic control unit being configured to operate the actuator to press the chord portion such that the winding radiuses of the chain belt are maintained and a raceway length of the chain belt is made longer than a raceway length of the chain belt before the pressing by a predetermined amount or more,
    the predetermined amount being a circumferential extension amount of the chain belt when the magnitude of the hydraulic pressure is the first predetermined value.
2. The variable transmission system for the vehicle, according to claim 1, wherein
    the chain belt includes a plurality of plate-shaped links and a plurality of pins, each of the links has a communicating hole, each of the pins is fitted in the communicating holes so as to connect the links to each other annularly, the pins are configured such that both end surfaces make contact with the pulleys so as to serve as power transmission surfaces, the head is configured by a roller member and configured to press the pins by a projection portion, the roller member is a member having a circular column shape and having a rotating axis in a direction perpendicular to a moving direction of the chain belt, and the projection portion is provided in an axial end of the roller member so as to project in a radial direction.

3. The variable transmission system for the vehicle, according to claim 1, wherein the actuator communicates with an oil passage via a control valve and is configured such that, when the magnitude of the hydraulic pressure reaches a second predetermined value or more, the hydraulic pressure is supplied to the actuator from the oil passage via the control valve such that the actuator operates, the oil passage being an oil passage configured to supply the hydraulic pressure to the second moving sheave.

4. The variable transmission system for the vehicle, according to claim 1, wherein the head is configured not to abut with the chain belt when the actuator does not operate.

5. The variable transmission system for the vehicle, according to claim 1, wherein the head is placed so as to be opposed to the chord portion on a side where the chain belt is sent from the primary pulley toward the secondary pulley.

\* \* \* \* \*